(12) United States Patent
Carlsson

(10) Patent No.: US 10,696,309 B2
(45) Date of Patent: Jun. 30, 2020

(54) METHOD AND USER EQUIPMENT FOR HANDLING ACTIONS PERFORMED BY A VEHICLE

(71) Applicant: VOLVO CAR CORPORATION, Gothenburg (SE)

(72) Inventor: Stina Carlsson, Vastra Frolunda (SE)

(73) Assignee: VOLVO CAR CORPORATION, Gothenburg (SE)

( * ) Notice: Subject to any disclaimer, the term of this patent is extended or adjusted under 35 U.S.C. 154(b) by 0 days.

(21) Appl. No.: 16/008,278

(22) Filed: Jun. 14, 2018

(65) Prior Publication Data

US 2018/0370545 A1 Dec. 27, 2018

(30) Foreign Application Priority Data

Jun. 21, 2017 (EP) .................................. 17177122

(51) Int. Cl.
*B60W 50/14* (2020.01)
*B60W 50/08* (2020.01)
*H04W 4/40* (2018.01)
*G07C 5/08* (2006.01)
*B60W 50/00* (2006.01)

(52) U.S. Cl.
CPC .......... *B60W 50/14* (2013.01); *B60W 50/085* (2013.01); *G07C 5/0816* (2013.01); *H04W 4/40* (2018.02); *B60K 2370/161* (2019.05); *B60K 2370/566* (2019.05); *B60W 2050/0077* (2013.01); *B60W 2050/146* (2013.01)

(58) Field of Classification Search
CPC .... B60K 2350/108; B60W 2050/0077; B60W 2050/146; B60W 50/085; B60W 50/14; G07C 5/08; H04W 4/40
See application file for complete search history.

(56) References Cited

U.S. PATENT DOCUMENTS

| 6,330,499 | B1* | 12/2001 | Chou | ..................... G07C 5/008 701/31.4 |
| 9,139,091 | B1 | 9/2015 | Penilla | |
| 2009/0171688 | A1* | 7/2009 | Ikeda | ..................... G01C 21/34 705/346 |
| 2010/0222939 | A1* | 9/2010 | Namburu | ............ G07C 9/00111 701/2 |
| 2015/0088375 | A1 | 3/2015 | Lee et al. | |
| 2016/0173568 | A1* | 6/2016 | Penilla | ..................... G06F 17/00 709/217 |

FOREIGN PATENT DOCUMENTS

DE 10 2007 007 982 A1 10/2008
DE 10 2013 003 496 A1 8/2013

OTHER PUBLICATIONS

Extended European Search Report dated Jan. 10, 2018, Application No. 17177122.3-1012 , Applicant Volvo Car Corporation, 6 Pages.

\* cited by examiner

*Primary Examiner* — Sisay Yacob
(74) *Attorney, Agent, or Firm* — Brooks Kushman P.C.

(57) ABSTRACT

The embodiments herein relate to a method performed by a UE for handling actions performed by a vehicle. The UE obtains, from the vehicle, action information indicating that an action has been performed by a system comprised in the vehicle. The UE notifies a user after the action has ended that the action has been performed, and provides additional information about the performed action to the user.

15 Claims, 3 Drawing Sheets

METHOD AND USER EQUIPMENT FOR HANDLING ACTIONS PERFORMED BY A VEHICLE

CROSS-REFERENCE TO RELATED APPLICATIONS

This application claims foreign priority benefits under 35 U.S.C. § 119(a)-(d) to European patent application number EP 17177122.3, filed Jun. 21, 2017, which is incorporated by reference in its entirety.

TECHNICAL FIELD

Embodiments herein relate generally to a User Equipment (UE) and a method performed by the UE. More particularly the embodiments herein relate to handling actions performed by a vehicle.

BACKGROUND

Today's vehicles comprise several complex systems with different purposes such as, but not limited to, the following: to protect the occupants (passive safety), to prevent or mitigate an accident (active safety), to support the user in the task of operating the vehicle (driver/user support), to keep the user informed of the vehicle and its surroundings (infotainment and navigation), to help the user to interact with the vehicle (e.g., voice control), to secure the vehicle from a break-in or being stolen or to make the user feel secure (security systems), affect the vehicles driving performance (engine and chassis systems) and even to drive the vehicle autonomous or semi-autonomous. The different systems in a vehicle can be difficult for the user to understand.

For example, when driving a modern vehicle, the vehicle can provide the user with different kinds of warnings, information and interventions from the systems during the ride. If these actions are well designed, the user will react in the best possible way. Still, the user may not be sure that he has understood the system completely. He might wonder what really happened, the reason for the warning or intervention, and how the system actually works. This could even affect the user's attention on the actual driving task. The user will probably think of this during the ride when the action appears, but when he has arrived at his destination he does not usually bring out the Owner's manual (or equivalent) and go through the different systems in order to understand what really happened. It is not even necessary for the user to be driving the vehicle for this situation to occur For example, the user may sit in the vehicle with the engine running at a parking place and get a warning for a vehicle or pedestrian that passes the rear of the vehicle. In the end, this uncertainty and confusion may make the user annoyed or stressed by the different warnings, information and interventions. Therefore, there is a need to at least mitigate or solve this issue.

SUMMARY

An objective of embodiments herein is therefore to obviate at least one of the above disadvantages and to provide a user with improved vehicle knowledge.

According to a first aspect, the object is achieved by a method performed by a UE for handling actions performed by a vehicle. The UE obtains from the vehicle, action information indicating that an action has been performed by a system comprised in the vehicle. The UE notifies a user after the action has ended that the action has been performed. The UE provides additional information about the performed action to the user.

According to a second aspect, the object is achieved by a UE for handling actions performed by a vehicle. The UE is configured to obtain, from the vehicle, action information indicating that an action has been performed by a system comprised in the vehicle. The UE is configured to notify the user after the action has ended that the action has been performed. The UE is configured to provide additional information about the performed action to the user.

Since the additional information about the performed action is made available to the user after the action has ended, and possibly also after the use of the vehicle has ended, the user is provided with improved vehicle knowledge.

Embodiments herein afford many advantages, of which a non-exhaustive list of examples follows:

An advantage of the embodiments herein in is that the user is provided with improved vehicle knowledge. With improved vehicle knowledge, the user's understanding and operation of the vehicle is also improved.

A further advantage is that since the additional information is provided to the user after the action is ended, there is no safety risk during when the user obtains the deeper understanding of the performed action compared to if the information was provided during the action.

Another advantage of the embodiments herein is that they provide increased flexibility in that the user can change settings for the vehicle system or switch the system on or off based on the additional information.

Another advantage of the embodiments herein is that from the additional information, the user can learn how to react the next time the action occurs, for example drive more comfortably, drive in order to save fuel, etc.

Another advantage of the embodiments herein is that they provide a safer operation of the vehicle (and hereby increased traffic safety), in that the user can have changed system settings before he starts using the vehicle, e.g., before he enters the vehicle, instead of doing this while driving.

Another advantage of the embodiments herein is that they provide increased flexibility in that if the user deems that the additional information was sufficient, he can answer that he shall not be notified the next time the same action occurs.

The embodiments herein are not limited to the features and advantages mentioned above. A person skilled in the art will recognize additional features and advantages upon reading the following detailed description.

BRIEF DESCRIPTION OF THE DRAWINGS

The embodiments herein will now be further described in more detail in the following detailed description by reference to the attached drawings.

The drawings are not necessarily to scale and the dimensions of certain features may have been exaggerated for the sake of clarity. Emphasis is instead placed upon illustrating the principle of the embodiments herein.

DETAILED DESCRIPTION

Figure 1:
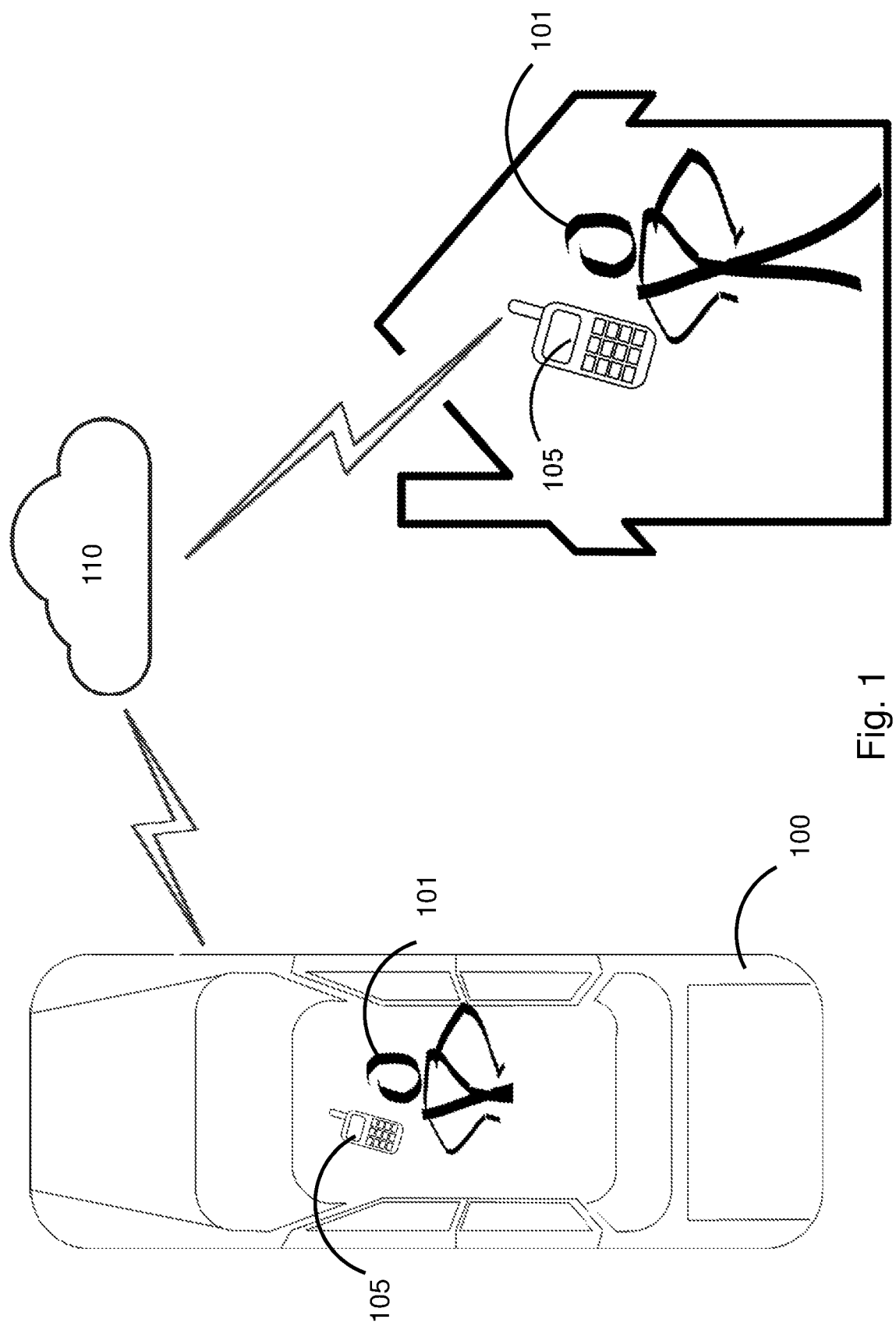
FIG. 1 is a schematic drawing illustrating an embodiment of a system.

FIG. 1 illustrates a vehicle 100 which is driven by a driver 101. The driver 101 may also be a user 101 of a User Equipment (UE) 105 or the UE 105 may have a user which is not the driver 101. The driver 101 of the vehicle 100 may therefore be the same person as the user 101 of the UE 105, or they may be different persons. They may be different persons when for example the user 101 of the UE 105 is a passenger of the vehicle 100. However, the driver 101 of the vehicle 100 and the user 101 of the UE 105 are both associated with the vehicle 100 in that the UE 105 and the vehicle 100 are somehow connected, as detailed below. Thus, the term driver and user are used interchangeably herein when referring to the driver of the vehicle 100 and the user of the UE 105, regardless of whether they are the same or different person.

The vehicle 100 may be any arbitrary vehicle, for instance a car, truck, lorry, van, bus, motorcycle, etc. The vehicle 100 may be at least partly autonomous or self-driven, it may be completely autonomous or self-driven, or it may be non-autonomous, etc.

The UE 105 may be a device by which a subscriber may access services offered by an operator's network and services outside the operator's network to which the operator's radio access network and core network provide access, e.g., access to the Internet. The UE 105 may be any device, mobile or stationary, enabled to communicate in the communications network, for instance—but not limited to, e.g., user equipment, mobile phone, smart phone, sensors, meters, vehicles, household appliances, medical appliances, media players, cameras, Machine to Machine (M2M) device, Device to Device (D2D) device, Internet of Things (IoT) device or any type of consumer electronic, for instance but not limited to television, radio, lighting arrangements, tablet computer, laptop or Personal Computer (PC). The UE 105 may be portable, pocket storable, hand held, computer comprised, or a vehicle mounted device, enabled to communicate voice and/or data, via the radio access network, with another entity, such as another UE or a server.

There may be one or more UEs 105 which is associated with the vehicle 100 in that the UE 105 and the vehicle 100 are paired or linked to each other by establishing a connection between them. The connection may be a wireless or wired link, or the connection may be in the form of login at a website on the UE 105 by using an identification which is associated with the vehicle 100 and/or the user 101. The connection may use any suitable protocol depending on type and level of layer (e.g., as indicated by the OSI model) as understood by the person skilled in the art. The pairing may be initiated from the UE 105 or the vehicle 100. The pairing between the UE 105 and the vehicle 100 may typically have to be performed once. After the initial pairing, the UE 105 and the vehicle 100 may automatically connect to each other when they are in range of each other and when a connecting device (e.g., a Bluetooth device) in each of the UE 105 and the vehicle 100 is enabled. The pairing may require that the user 101 has an identity (ID) which is associated with both the UE 105 and the vehicle 100. The ID may be for example the vehicle key or any other device, code or other suitable means that gives the user 101 access to the vehicle 100.

The UE 105 may comprise a control system that enables the user 101 of the UE 105 and the vehicle 100 to remotely control and connect to the vehicle 100 via the UE 105. The control of the vehicle 100 may be for example to lock and unlock the vehicle 100, to control the climate system in the vehicle 100, to trace the vehicle 100, to remotely use the vehicle's infotainment system, etc. The control system may be in the form of a computer program downloadable to the UE 105, e.g., a software application.

The vehicle 100 may comprise a vehicle communication system (e.g., referred to as an infotainment system). The vehicle communication system comprises for example a radio, a media player, it is adapted to communicate with the UE 105 and/or the user 101, and it can be adapted to connect to a communications network 110 (e.g., the internet). The vehicle communication system may present information to the user 101 on a display comprised in the vehicle 100. The vehicle communication system may be operated by the user 101 using, e.g., voice commands, by using a steering wheel keyboard, by using touch screen buttons integrated in the display or by using buttons in the center console of the vehicle 100. The vehicle 100 may comprise a memory in which information and data can be stored. The vehicle 100 may be configured to transmit information and data to the communications network 110 for storing in a network memory, e.g., a cloud memory, or there may be both a memory in the vehicle 100 and in the cloud.

The UE 105 and the vehicle 100 may both be connected to the communications network 110. The communications network 110 may also be referred to as, e.g., a wireless communications network, a communications network, cellular network or a network. Nodes in the communications network 110 typically communicates over an air interface operating on radio frequencies with the UE 105 and the vehicle 100 in range of the network nodes. It should be noted that the communication links in the communications network may be of any suitable kind including either a wired or wireless link. The link may use any suitable protocol depending on type and level of layer (e.g., as indicated by the OSI model) as understood by the person skilled in the art.

The user 101 may have the UE 105 with him when he is in the vehicle 100 and when he is outside the vehicle 100, for example when he is at home as illustrated on the right-hand side of FIG. 1. At both locations, the UE 105 is configured to be connected to the communications network 110. In another example, the UE 105 is a device which the user 101 does not bring to the vehicle 100. For example, the user 101 does not bring the UE 105 to the vehicle 100 if the UE 105 is for example a stationary computer.

The vehicle 100 comprises one or more systems, and such systems may be referred to as vehicle systems. The vehicle system may perform one or more actions. As mentioned earlier, a vehicle system may ha different purposes such as to protect the occupants (passive safety), to prevent or mitigate an accident (active safety), to support the user in the task of operating the vehicle (driver/user support), to keep the user informed of the vehicle and its surroundings (infotainment and navigation), to help the user to interact with the vehicle (e.g., voice control), to secure the vehicle 100 from a break-in or being stolen or to make the user feel secure (security systems), affect the vehicle's driving performance (engine and chassis systems) and even to drive the vehicle autonomous or semi-autonomous. The vehicle system may be, for example, a passive safety system, an active safety system, a security system, etc. In automotive industry, passive safety systems may be defined as systems that are designed to protect the occupants in the vehicle 100 in case that an accident occurs, for instance with airbag systems and safety belt systems. The active safety systems may be defined as systems that are designed to act before an accident, to prevent the accident from happen or otherwise to mitigate the effect of the accident. Such active safety system may be for example Anti-lock Braking System (ABS) brakes, roll stability control, different systems using automatic braking such as City Safety or Collision mitigation by braking or similar. Security systems may be described as systems that secure the vehicle 100 from being stolen or make the occupants feel secure and safe in the vehicle 100. Security systems may be different from other systems in that they may be active also when the vehicle 100 is standing still, engine is off and locked, e.g., an anti-theft system. Below is a list of some examples of vehicle systems that may perform the action:

- System using automatic braking for avoiding or mitigating collisions with, e.g., other vehicles, cyclists, pedestrians or large animals
- System for avoiding or mitigating collisions with oncoming vehicles in intersections
- City Safety with steering support
- Cross Traffic Alert
- Rear Collision Warning with braking at standstill
- Adaptive Cruise Control
- Cruise Control
- Lane Keeping Aid
- Pilot Assist, Semi-autonomous drive
- Run-off Road Protection
- Run-off Road Mitigation
- Roll Stability Control (RSC)
- Blind Spot Information System
- Blind Spot Information System with steer assist
- Distance Alert
- Drive Alert Control
- Hill Descent Control
- Hazard Light Alert using Connected Safety
- Hill start assist
- Lane Departure Warning
- Oncoming Lane Mitigation
- Park Assist Pilot
- Rear Park Assist Camera
- Park Assist Pilot with steering support
- Road Sign Information
- Speed Limiter
- Slippery Road Alert using Connected Safety
- Tire Pressure Monitoring System
- Low Speed Control
- Auto-hold brakes
- Hill Start Assist
- ECO drive mode
- Drive Mode Settings
- Voice control
- Pedestrian Protection System (PPS)
- "Four-C" Continuously Controlled Chassis Concept
- Electric belt retractor The action that takes place may be a warning, an intervention or information (e.g., Slippery Road Alert using Connected Safety). It may also be information indicating that a particular system in the vehicle 100 needs to shut down, e.g., due to sensor malfunction or bad weather.

If a system in the vehicle 100 makes an action, e.g., gives a warning, the action information indicating the performed action may be stored locally in the vehicle 100, it may be sent to the communications network 110 for storing or it may be sent to the UE 101. For example, if the action information is stored locally in the vehicle 100, the stored information can be sent (e.g., when the action has ended or when use of the vehicle 100 has ended) through, e.g., the vehicle's 100 communication system to the communications network 110 (e.g., a cloud server or similar system) from which the UE 105 can obtain the action information. In another example, the action information may be immediately sent to the communications network 110 (e.g., a cloud memory) for storing (without first being locally stored in the vehicle 100), i.e., immediately when the action is started. By using a vehicle ID (or similar personal identification), the information can be made available to the user 101 by means of the UE 105 and after the action has ended, or after the use of the vehicle 100 has ended, for example after the ride has ended, after the vehicle 100 has come to a stop and/or after the engine has been shut off.

The user 101 can be informed about the performed action by, e.g., a notification in a vehicle application on the UE 105—for example when the UE 105 is a smartphone (or similar application on a computer or tablet)—that states, e.g.:

"This system was activated during your last ride. Do you want to know more?"

The user 101 can also be informed about the performed action in other ways, e.g., with an e-mail, SMS or any other way that is suitable for communication from the notifying unit to the user 101.

The user 101 can then, e.g., be guided to additional information which may be a system description that explains the purpose of the system, how it works as well as why the warning (or other action) was initiated. This can be the information already available in the Owner's manual (or equivalent). The information can include more details from the actual ride to get the user 101 to understand more deeply why the system was activated. The additional information can be in the form of animations that explains how the system works. If the system can be switched off (and on) the animations mentioned above can be used to show the benefit of using the system (e.g., Lane departure Warning/lane keeping aid). If the system can have different settings (not only on and off), the animations mentioned above can be used to show the differences of the different system settings (e.g., different time-gap for Adaptive Cruise Control (ACC)). The additional information can be for example a game that allows the user 101 to understand the effect of different systems and settings safely in the sofa and not experimenting out on the road.

When the user 101 has got the additional information and, e.g., wants to end the application on the smartphone 105 (or similar application on a computer or tablet), the UE 101 can ask the user 101, e.g., the following question:

"We hope that the information about [system name] has been valuable to you. Do you want to have a notification the next time this system makes a warning (or intervention)?"

The user 101 can in this way easily make a choice.

The provisioning of additional information may be switched on and off by the user 101 using the UE 105 (e.g., via an application on a smartphone 105 (or similar application on a computer or tablet)).

As mentioned above, there may be one or more UEs 105 which is associated with the vehicle 100 and consequently there may be one or more users 101 associated with the vehicle. Therefore, there may be one or more UEs 105 which are present inside the vehicle 100 during use of the vehicle 100. Even in an embodiment where there are two or more UEs 105 associated with the vehicle 100, it may be merely one UE 105 which is localized in the vehicle 100 during use of the vehicle 100 or it may be two or more UEs 105 which are localized in the vehicle 100 during the use. If there are two or more associated UEs 105 localized in the vehicle 100, the additional information may be provided to the user 101 of the UE 105 which is the driver of the vehicle 100 or it may be provided to a user 101 of the UE 105 which is not the driver of the vehicle 100 (e.g., a passenger having a UE 105 which is connected to the vehicle 100), or it may be provided to both the user 101 of the UE 105 which is the driver and the user of another UE(s) 105 which is not the driver (e.g., the passenger). In case there are two or more UEs 105 present in the vehicle 100 during a ride, the vehicle 100 needs to determine if it should provide action information to all or to only some of the present UEs 105, and to which of the two or more UEs 105 it should provide the action information. For example, the vehicle 100 may determine that only the UE 105 which has a user which is the driver of the vehicle 100 should be provided with action information. The UE 105 which has a user which is also the driver 101 of the vehicle 100 may therefore be seen as having a higher priority compared to the other UEs 105. In another example, the vehicle may determine that all UEs 105 localized in the vehicle 100 should be provided with the action information, or only the UEs 105 which has requested such information.

The embodiments herein relate to actions performed by vehicle systems comprised in the vehicle 100. Examples of such vehicle systems—although not limited thereto—are active and passive safety systems, security systems, systems for user support, infotainment, navigation and even systems to drive the vehicle autonomous or semi-autonomous, etc.

With the embodiments herein, a self-explaining vehicle 100 is provided. The vehicle 100 is self-explaining in that it provides action information to the UE 105 when an action has been performed, such that the user 101 can be provided with additional information about said action and subsequently get an explanation thereof.

The method for handling actions performed by a vehicle 100 according to some embodiments will now be described with reference to the flowchart depicted in FIG. 2. The method is performed by the UE 105. The method illustrated in FIG. 2 comprises at least one of the following steps, which steps may as well be carried out in another suitable order than described below.

Step 201

The UE 105 obtains, from the vehicle 100, action information indicating that an action has been performed by the vehicle 100, e.g., by a system comprised in the vehicle 100. The action may have been performed during a ride, or when the vehicle 100 is standing still (e.g., when it is parked) with or without the engine running. When the vehicle 100 is standing still, the action may have been performed by, e.g., the security systems.

The action information may be obtained upon request from the user 101 or provided to the UE 105 on regular basis (e.g., after each ride) or provided when the action has been performed.

The action information may be obtained directly from the vehicle 100 or via a communications network 110.

The action information may be obtained by the UE 105 substantially at the same time the action takes place, it may be obtained after the action has taken place, and it may be obtained after the ride has ended, or it may be obtained during the ride.

The action information indicates that an action has taken place. The action information may also indicate, but is not limited to, information indicating: the time when the action took place, the vehicle's 100 location when the action took place, the vehicle's 100 speed when the action took place, the distance to surrounding vehicles (e.g., the vehicle in front of the vehicle 100) when the action took place.

The action may be for example that the vehicle 100 performs a hard safety brake, that a blind spot detection lamp has been activated, etc.

The system which performs the action may be any system of the vehicle 100, e.g., active and passive safety systems, security systems, systems for user support, infotainment systems, navigation systems and even systems to drive the vehicle 100 autonomously or semi-autonomously, etc.

Step 202

The UE 105 notifies the user 101, after the action has ended, that the action has been performed. In some examples, the UE 105 may be notified after the action has ended and after the ride has ended. The UE 105 may notify the user 101 by displaying a visual message on the UE's display or a display in the vehicle 100 (for example in a scenario where a UE's display is mirrored in a vehicle display) which indicates that the action has been performed, the UE 105 may play an audio message informing the user 101 of the performed action, etc. For example, when the action has been performed during use of the vehicle 100, the user 101 may be notified after the action has ended and after the use of the vehicle 100 has ended. The user 101 can also be informed about the performed action in other ways, e.g., with an e-mail, SMS or any other way that is suitable for communication from the notifying unit to the user 101.

As described earlier, the user 101 may be both the user of the UE 105 and the driver 101 of the vehicle 100, or it may be a user 101 of the UE 105 associated with the vehicle 100 in another way than being the driver 101, e.g., it may be a passenger of the vehicle 100, and/or it may be a second owner of the vehicle 100, etc.

Step 203

The UE 105 may send a query to the user 101 whether additional information about the performed action should be provided to the user 101.

Step 204

The UE 105 may receive a response from the user 101 which indicates that additional information should be provided or not provided to the user 101. The response is a response to the query in step 203.

Step 205

The UE 105 provides additional information about the performed action to the user 101.

The additional information may be at least one of, but not limited to: an owner's manual, a purpose of the performed action and a purpose of the system which performed the action.

Step 206

The UE 105 may enable settings of the system to be changed based on the additional information. Changing the setting may involve switching the system on or off. The changed setting may be transferred to the vehicle 100 and the concerned system.

Step 207

The UE 105 may send a query to the user 101 whether he should be notified next time the same action is performed by the system.

Step 208

The UE 105 may receive a response from the user 101 that he should not be notified the next time the same action is performed.

Step 209

When the same action is performed for the second or more times, the UE 105 may determine that the user 101 should not be notified that the action has been performed according to the received response.

Some of the steps described above may be performed by the communication network 110 and/or the vehicle 100 instead of the UE 105. For example, the UE's 105 display may be mirrored in a display in the vehicle 100 and in such case the method steps above may be seen as being performed by the vehicle 100 instead of the UE 105, or performed by the UE 105 in cooperation with the vehicle 100. The additional information may therefore be seen in the UE's 105 display and/or a display in the vehicle 100.

The method could also be used to make the user 101 aware of a system that is comprised in the vehicle 100, but which the user has not yet used. As an example, assume that the user 101 has used the vehicle 100 for a period of time (days, weeks or months) and he has not yet used the voice control. The user 101 could then be informed of the system using the embodiments herein, where the action information in this case is that the user 101 has not used the system.

Figure 2:
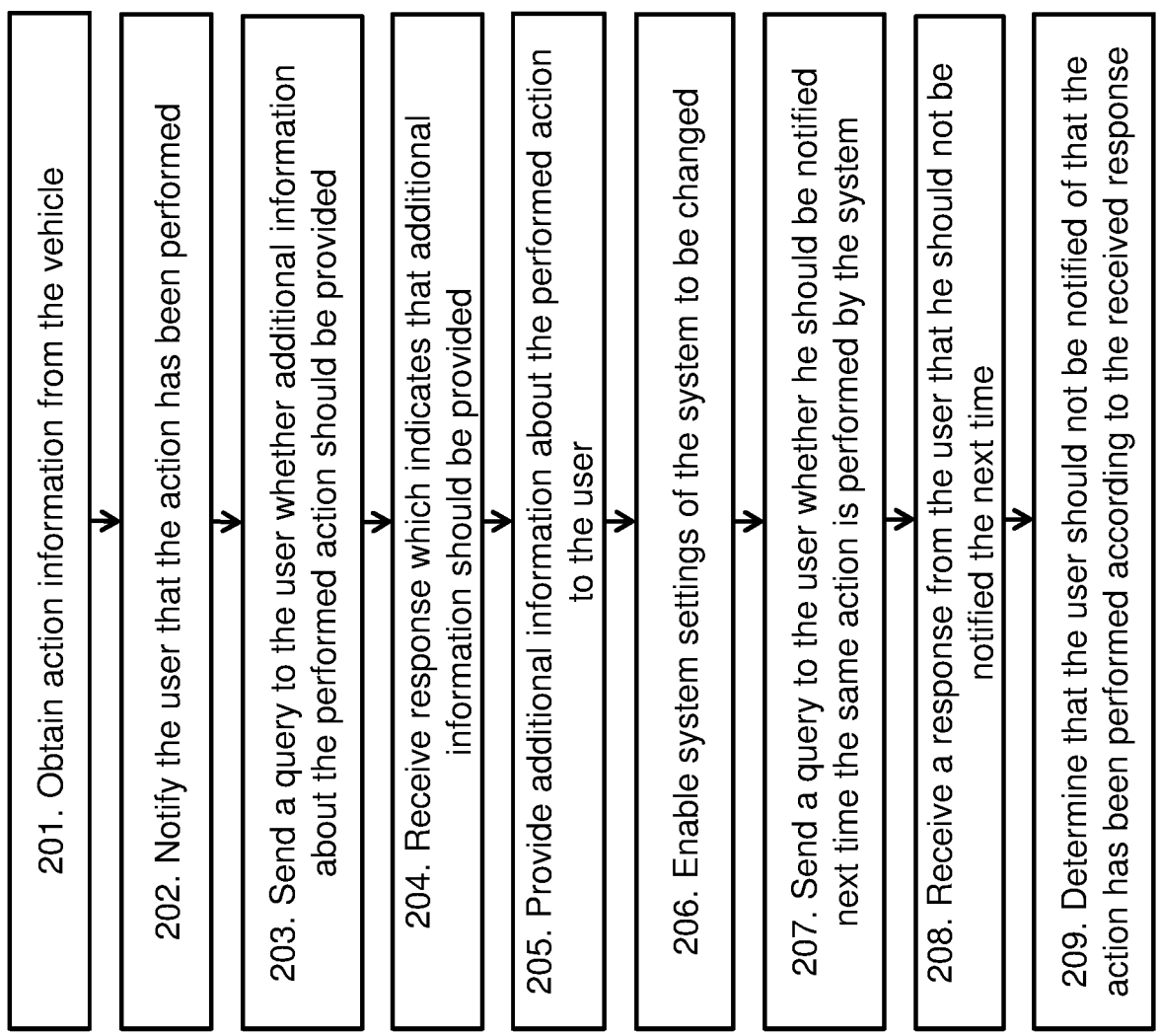
FIG. 2 is a flow chart illustrating embodiments of a method.
Figure 3:
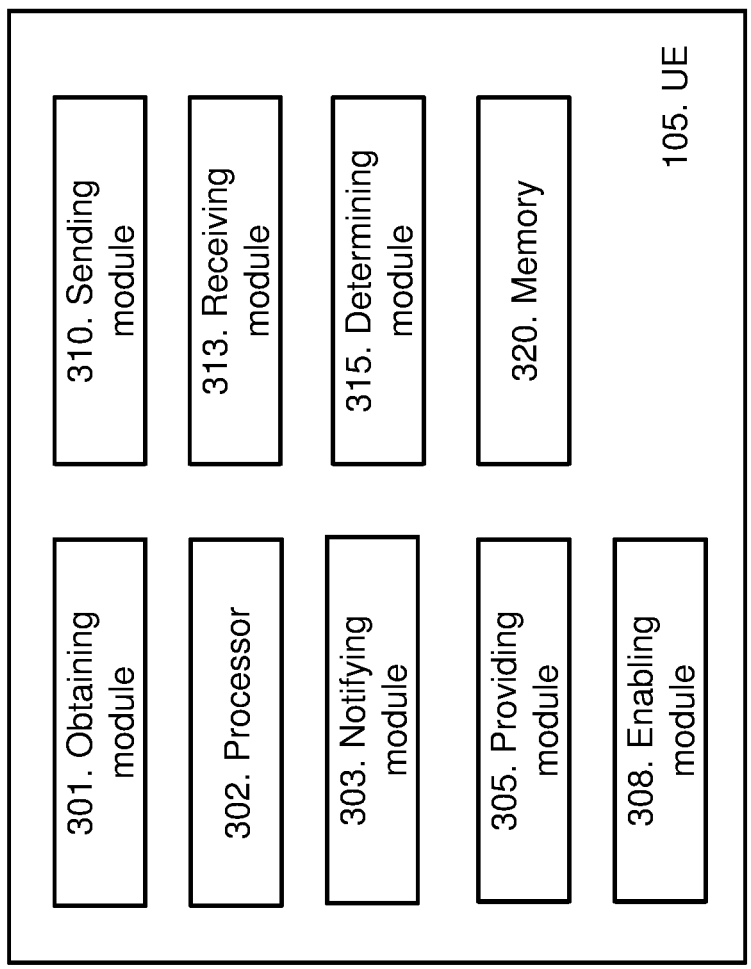
FIG. 3 is a schematic block diagram illustrating embodiments of a UE.

To perform the method steps shown in FIG. 2 for handling actions performed by a vehicle 100, the UE 105 may comprise an arrangement as shown in FIG. 3.

The UE 105 is configured to, e.g., by means of an obtaining module 301, obtain, from the vehicle 100, action information indicating that an action has been performed by a system comprised in the vehicle 100 during a ride. The action information may be obtained upon request from the user 101 or provided to the UE 105 on regular basis or provided when the action has been performed. The action information may be obtained directly from the vehicle 100 or via a communications network 110. The obtaining module 301 may also be referred to as an obtaining unit, an obtaining means, an obtaining circuit, means for obtaining, etc. The obtaining module 301 may be a processor 302 of the UE 105.

The UE 105 is configured to, e.g., by means of a notifying module 303, notify the user 101 after the action has ended that the action has been performed. The action may have been performed during use of the vehicle 100, and the user 101 may then be notified after the action has ended and after use of the vehicle 100 has ended. The notifying module 303 may also be referred to as a notifying unit, a notifying means, a notifying circuit, means for notifying, etc. The notifying module 303 may be the processor 302 of the UE 105.

The UE 105 is configured to, e.g., by means of a providing module 305, provide additional information about the performed action to the user 101. The additional information may be at least one of: an owner's manual, a purpose of the performed action, a purpose of the system which performed the action, etc. The providing module 305 may also be referred to as a providing unit, a providing means, a providing circuit, means for providing, etc. The providing module 305 may be the processor 302 of the UE 105.

The UE 105 may be configured to, e.g., by means of an enabling module 308, enable settings of the system to be changed based on the additional information. The enabling module 308 may also be referred to as an enabling unit, an enabling means, an enabling circuit, means for enabling, etc. The enabling module 308 may be the processor 302 of the UE 105.

The UE 105 may be configured to, e.g., by means of a sending module 310, send a query to the user 101 whether additional information about the performed action should be provided. The sending module 310 may also be referred to as a sending unit, a sending means, a sending circuit, means for sending, output unit, etc. The sending module 310 may be a transmitter, a transceiver, etc. The sending module 310 may be a wireless transmitter of the UE 105 of a wireless or fixed communications system.

The UE 105 may be configured to, e.g., by means of a receiving module 313, receive a response from the user 101 which indicates that additional information should be provided. The receiving module 313 may also be referred to as a receiving unit, a receiving means, a receiving circuit, means for receiving, input unit, etc. The receiving module 313 may be a receiver, a transceiver, etc. The receiving module 313 may be a wireless receiver of the UE 105 of a wireless or fixed communications system.

The UE 105 may be configured to, e.g., by means of the sending module 310, send a query to the user 101 whether he should be notified next time the same action is performed by the system.

The UE 105 may be configured to, e.g., by means of the receiving module 313, receive a response from the user 101 that he should not be notified the next time the same action is performed.

The UE 105 may be configured to, e.g., by means of a determining module 315, determine, when the same action is performed for the second or more times, that the user 101 should not be notified that the action has been performed according to the received response. The determining module 315 may also be referred to as a determining unit, a determining means, a determining circuit, means for determining, etc. The determining module 15 may be the processor 302 of the UE 105.

In some embodiments, the UE 105 comprises a memory 320. The memory 320 comprises instructions executable by the processor 302. The memory 320 is arranged to be used to store data, action information, additional information, queries, responses, settings, threshold values, time periods, configurations, schedulings, and applications to perform the methods herein when being executed in the UE 101.

The communication network 110 may also comprise a network memory, e.g., a cloud memory. The vehicle 100 may also comprise a vehicle memory.

The present mechanism for handling actions performed by a vehicle 100 may be implemented through one or more processors, such as a processor 302 in the UE 105 depicted in FIG. 3, together with computer program code for performing the functions of the embodiments herein. The processor may be for example a Digital Signal Processor (DSP), Application Specific Integrated Circuit (ASIC) processor, Field-programmable gate array (FPGA) processor or microprocessor. The program code mentioned above may also be provided as a computer program product, for instance in the form of a data carrier carrying computer program code for performing the embodiments herein when being loaded into the UE 105. One such carrier may be in the form of a CD ROM disc. It is however feasible with other data carriers such as a memory stick. The computer program code can furthermore be provided as pure program code on a server and downloaded to the UE 105.

In some embodiments, a computer program may comprise instructions which, when executed on at least one processor, cause the at least one processor to carry out at least one of the method steps in FIG. 2. A carrier may comprise the computer program, and the carrier is one of an electronic signal, optical signal, radio signal or computer readable storage medium.

The embodiments herein are not limited to the above described embodiments. Various alternatives, modifications and equivalents may be used. Therefore, the above embodiments should not be taken as limiting the scope of the embodiments, which is defined by the appending claims.

It should be emphasized that the term "comprises/comprising" when used in this specification is taken to specify the presence of stated features, integers, steps or components, but does not preclude the presence or addition of one or more other features, integers, steps, components or groups thereof. It should also be noted that the words "a" or "an" preceding an element do not exclude the presence of a plurality of such elements. The terms "consisting of" or "consisting essentially of" may be used instead of the term comprising.

The term "configured to" used herein may also be referred to as "arranged to", "adapted to", "capable of" or "operative to".

It should also be emphasized that the steps of the methods defined in the appended claims may, without departing from the embodiments herein, be performed in another order than the order in which they appear in the claims.

What is claimed is:

1. A method performed by a User Equipment, UE, for handling actions performed by a vehicle, the method comprising:
    obtaining, from the vehicle, action information indicating that an action has been performed by a system comprised in the vehicle;
    notifying a user after the action has ended that the action has been performed;
    providing additional information about the performed action to the user;
    enabling settings of the system to be changed based on the additional information;
    sending a query to the user whether additional information about the performed action should be provided; and
    receiving a response from the user which indicates whether additional information should be provided or not.

2. The method according to claim 1, wherein the action information is obtained upon request from the user or provided to the UE on a regular basis or provided when the action has been performed.

3. The method according to claim 1, wherein the action has been performed during use of the vehicle, and wherein the user is notified after the action has ended and after use of the vehicle has ended.

4. The method according to claim 1 further comprising:
    sending a query to the user whether he should be notified next time the same action is performed by the system;
    receiving a response from the user that he should not be notified the next time the same action is performed; and
    when the same action is performed for the second or more times, determining that the user should not be notified that the action has been performed according to the received response.

5. The method according to claim 1, wherein the additional information is at least one of: an owner's manual, a purpose of the performed action, a purpose of the system which performed the action.

6. The method according to claim 1, wherein the UE comprises one or more processors for use in performing the method.

7. A User Equipment, UE, for handling actions performed by a vehicle, the UE being configured to:
    obtain, from the vehicle, action information indicating that an action has been performed by a system comprised in the vehicle;
    notify the user after the action has ended that the action has been performed;
    provide additional information about the performed action to the user;
    enable system settings of the system to be changed based on the additional information;
    send a query to the user whether additional information about the performed action should be provided; and
    receive a response from the user which indicates whether additional information should be provided or not.

8. The UE according to claim 7, wherein the UE comprises a transmitter configured to send the query, and a receiver configured to receive the response.

9. The UE according to claim 7, wherein the UE comprises a transceiver configured to send the query and receive the response.

10. The UE according to claim 7, wherein the UE is configured to obtain the action information upon request from the user or on a regular basis or when the action has been performed.

11. The UE according to claim 7, wherein the action is performable during use of the vehicle, and wherein the UE is configured to notify the user after the action has ended and after use of the vehicle has ended.

12. The UE according to claim 7 being further configured to:
    send a query to the user whether he should be notified next time the same action is performed by the system;
    receive a response from the user that he should not be notified the next time the same action is performed; and
    when the same action is performed for the second or more times, determine that the user should not be notified that the action has been performed according to the received response.

13. The UE according to claim 7, wherein the additional information is at least one of: an owner's manual, a purpose of the performed action, a purpose of the system which performed the action.

14. The UE according to claim 7, wherein the UE comprises a processor for use in obtaining the action information from the vehicle.

15. A method performed by a User Equipment, UE, for handling actions performed by a vehicle, the method comprising:
    obtaining, from the vehicle, action information indicating that an action has been performed by a system comprised in the vehicle;
    notifying a user after the action has ended that the action has been performed;
    providing additional information about the performed action to the user;
    sending a query to the user whether additional information about the performed action should be provided; and
    receiving a response from the user which indicates that additional information should be provided.

* * * * *